United States Patent [19]
Petruchik et al.

[11] Patent Number: 5,619,738
[45] Date of Patent: Apr. 8, 1997

[54] PRE-PROCESSING IMAGE EDITING

[75] Inventors: Dwight J. Petruchik, Honeoye Falls; Joseph A. Manico, Rochester, both of N.Y.

[73] Assignee: Eastman Kodak Company, Rochester, N.Y.

[21] Appl. No.: 434,152

[22] Filed: May 2, 1995

[51] Int. Cl.⁶ ...................................... G03B 17/24
[52] U.S. Cl. ...................... 396/311; 396/315; 396/374
[58] Field of Search ............................. 354/75, 76, 105, 354/106; 348/64

[56]              References Cited

U.S. PATENT DOCUMENTS

| | | | |
|---|---|---|---|
| 4,603,966 | 8/1986 | Brownstein | 355/45 |
| 4,660,102 | 4/1987 | Kawakami et al. | 360/14.1 |
| 4,714,962 | 12/1987 | Levine . | |
| 4,716,470 | 12/1987 | Levine . | |
| 4,827,347 | 5/1989 | Bell | 358/224 |
| 4,888,605 | 12/1989 | Matsumoto | 354/75 |
| 5,021,820 | 6/1991 | Robison et al. . | |
| 5,023,635 | 6/1991 | Nealon | 354/76 |
| 5,023,650 | 6/1991 | Hoshino et al. | 354/441 |
| 5,122,821 | 6/1992 | Nealon | 354/76 |
| 5,164,751 | 11/1992 | Weyer | 354/76 |
| 5,172,234 | 12/1992 | Arita et al. | 358/224 |
| 5,301,026 | 4/1994 | Lee | 348/584 |

FOREIGN PATENT DOCUMENTS 5-188474  7/1993  Japan .......................... G03B 17/48

*Primary Examiner*—David M. Gray
*Attorney, Agent, or Firm*—Charles E. Snee, III; David A. Howley

[57]              ABSTRACT

A film camera including an electronic display is provided with a driver for presenting moveable markers to frame and edit the electronically displayed image. Electronic manipulation of the markers provides for zooming and cropping the image, as well as changing the image format and horizontal or vertical orientation. The control then records editing data on the film in a predetermined position relative to the exposed scene image. The camera includes an input for selecting a print format from a predetermined set of print formats, each having a predetermined size and aspect ratio, and the control limits the frame formats to those that are consistent with the selected print format.

12 Claims, 4 Drawing Sheets

PRE-PROCESSING IMAGE EDITING

BACKGROUND OF THE INVENTION

1. Field of Invention

The invention relates to photography and to cameras and processes using an electronic image for defining how a corresponding film exposure will be printed. More specifically, the invention relates to such cameras and processes that permit zooming, panning and cropping decisions before the film is developed and facilitates the transfer of those decisions to subsequent photofinishing operations.

2. Description of the Prior Art

Most image editing, at least for amateurs, occurs long after the original exposure. Other pictures are taken, using the full capacity of the film roll, and the roll is submitted to a dealer for processing and printing. When the finished prints are returned, they are viewed through standard editing frames, usually retained by the dealer, which are placed on top of the processed film or printed paper images to aid the editing process. Selections are made that define the desired formats, orientations, zoom ratios, panning positions and cropping. The film is then submitted to the dealer a second time with appropriate instructions for reprints and enlargements.

Some dealers offer an in-house service for creating reprints and enlargements from previously processed film or paper prints. An original image on film or paper is viewed with counter-top equipment that includes both editing and printing capabilities. Editing parameters are selected by the operator and a print is made immediately according to the chosen parameters. Apparatus and services of this type are sold under the trade name "Create-A-Print."

Still another approach is referred to as electronic proofing, usually employed by professionals. Electronic and film images are recorded simultaneously. The electronic image is then viewed on a monitor for selecting editing parameters. The parameters are recorded and submitted with the film for use by the photofinisher during processing and printing. Nealon U.S. Pat. No. 5,023,635, issued Jun. 11, 1991, discloses an example of this type that captures two images essentially simultaneously, one on photographic film and the other with a still video imager. The video image is viewed on a monitor, editing decisions are made, and instructions are magnetically recorded on the film. The magnetic records are registered with or adjacent the film frames to correlate the editing information with the appropriate frame.

Although electronic monitors have been provided on regular film cameras, as exemplified by the disclosure of Weyer U.S. Pat. No. 5,164,751, issued Nov. 17, 1992, they are limited to instantaneous review and do not provide for editing of the captured film image.

PROBLEM SOLVED BY THE INVENTION

The manual approach used by most amateurs tends to be cumbersome and inaccurate. The film must be developed first, resulting in substantial delay, and the instructions are relayed in writing that is imprecise. Two steps are required, and two prints produced, even when only the final print is desired.

The Create-A-Print approach is much faster. Reprints can be obtained at the dealers location when the original prints are returned. Still, however, the original print must be developed first, and two prints are purchased when only one may be desired.

Electronic proofing systems eliminate the requirement for the first print, but substitute expensive equipment that usually is justified only in professional applications. Electronic monitors are expensive, relatively immobile, and usually confined to professional studios.

SUMMARY OF THE INVENTION

The present invention is directed to overcoming one or more of the problems set forth above and to provide improved editing capability in a photographic camera. Briefly summarized, according to one aspect of the invention, a film camera including an electronic display, is provided with a driver for presenting moveable markers to frame and edit the electronically displayed image. Electronic manipulation of the markers provides for zooming, panning and cropping the image, as well as changing the image format and horizontal or vertical orientation. The control then records editing data on the film in a predetermined position relative to the exposed scene image.

According to more specific features, the control limits the selected frame to an aspect ratio consistent with standard roll sizes for photographic paper. The camera includes an input for selecting a print format from a predetermined set of print formats, each having a predetermined size and aspect ratio, and the control limits the frame formats to those that are consistent with the selected print format. Still more specifically, the film includes a transparent magnetic layer, the camera includes a magnetic head, and the control records the editing data magnetically through the head onto the magnetic recording layer. In a preferred embodiment, the same recording layer that records the data also includes a magnetically recorded representation of the electronic image.

The invention includes a process that captures editing information on film for use during photofinishing. According to the process: 1) photosensitive film is exposed in a camera to a scene image; 2) an electronic image representing the scene image is captured and displayed in the camera; 3) framing marks are manipulated relative to the electronic image to select printing factors including image format, zoom ratio, pan position and cropping; 4) the printing factors are recorded on the film in a predetermined position relative to the scene image; and 5) the selected printing factors are read from the film during photofinishing and applied to edit a print of the scene image.

The invention permits editing of photographic images when they are first exposed, so editing instructions can be applied to the original prints when the film is first developed. Editing parameters are selected with moveable framing marks that are easily manipulated for zooming, panning and cropping, and the potential selections can be limited to those consistent with standard sizes of photographic paper.

These and other features and advantages of the invention will be more clearly understood and appreciated from a review of the following detailed description of the preferred embodiments and appended claims, and by reference to the accompanying drawings.

DESCRIPTION OF THE PREFERRED EMBODIMENTS

Figure 1:
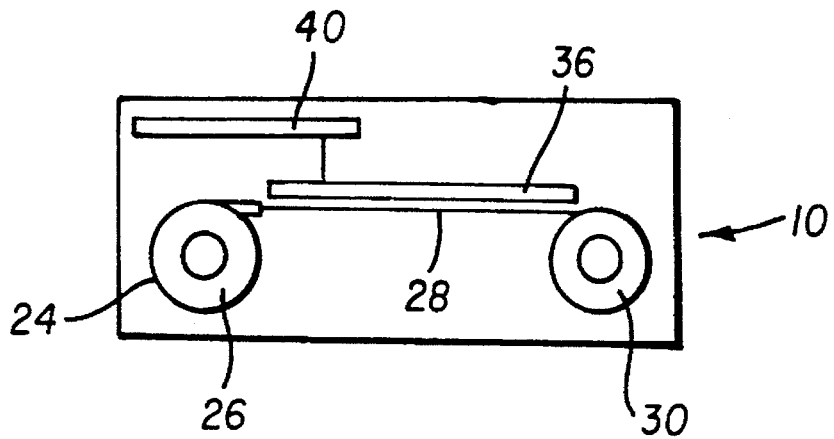
FIG. 1 is a top view of a photographic camera including chemical and magnetic media and volatile memory for capturing and editing scene images in accordance with a preferred embodiment of the invention.
Figure 2:
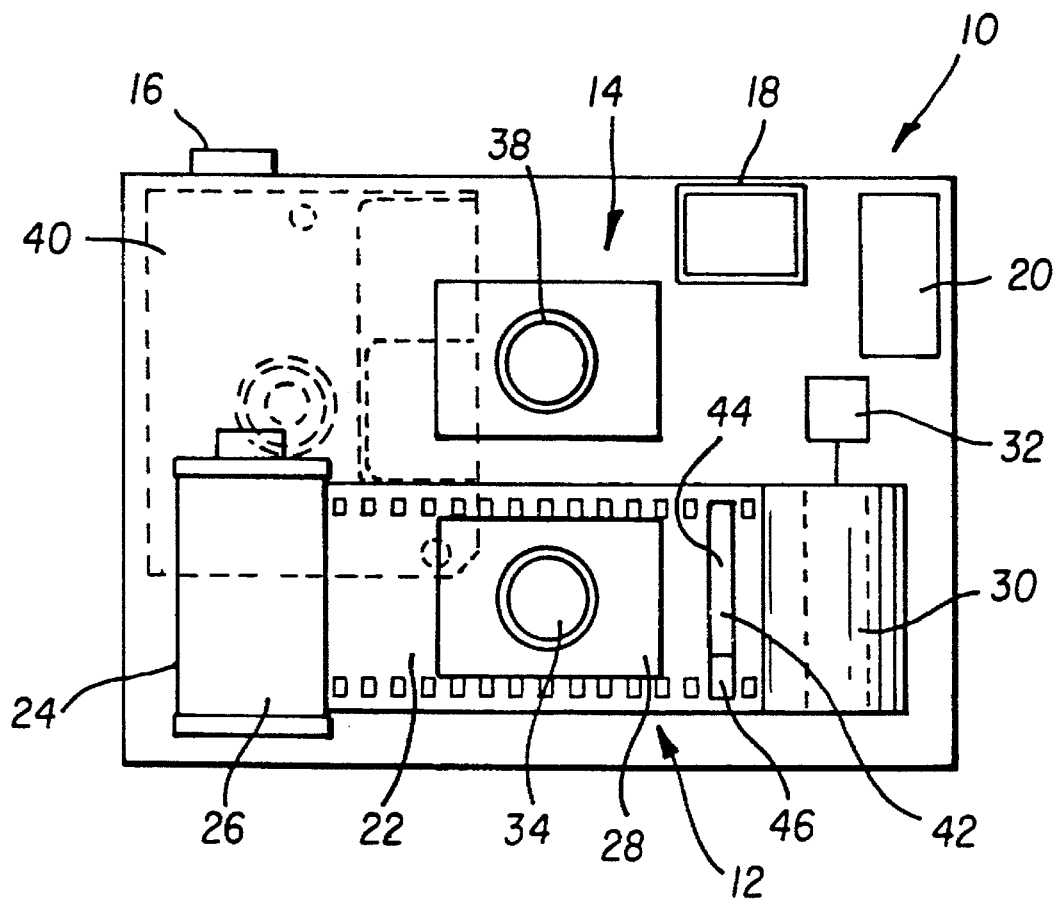
FIG. 2 is a front view of the camera of FIG. 1, depicting first optics and photographic film for capturing the chemical image and second optics and magnetic storage for capturing the electronic image.
Figure 3:
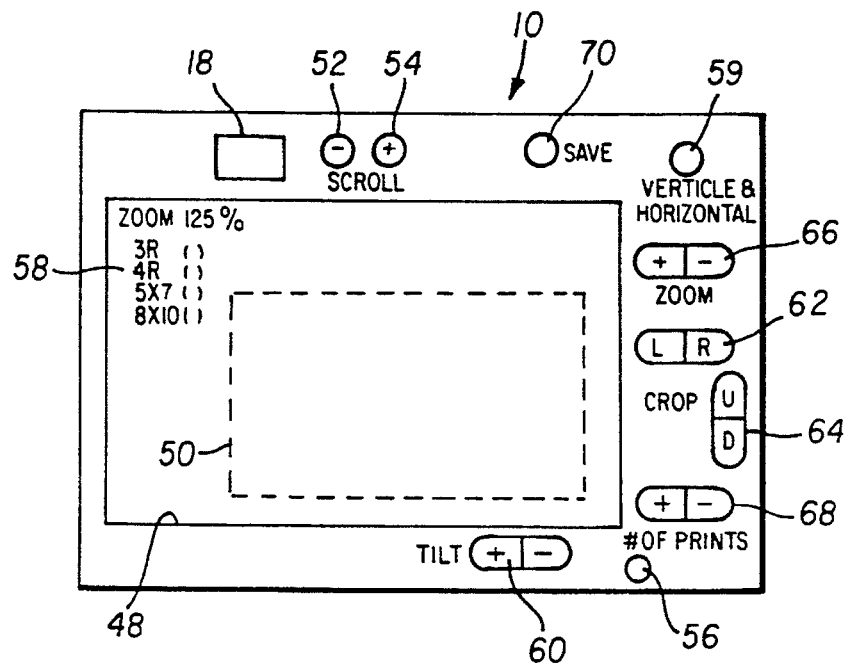
FIG. 3 is a back view of the camera of FIG. 1, depicting an electronic image display and various operating features for editing a scene in accordance with the preferred embodiment.

Referring now to the drawings, and beginning with FIGS. 1–3, a preferred embodiment of the invention is depicted in a camera 10 having conventional photographic components 12, electronic imaging components 14 and common features that support both the conventional and the electronic components.

The common features include an exposure initiating element 16, viewfinder 18 and electronic flash 20. The viewfinder 18 serves as a pointing aid for aiming the camera including the conventional and electronic components. Although an optical viewfinder is depicted, it will be apparent from the following description that the electronic components could be used for pointing the camera. The optical viewfinder 18 would then be unnecessary. The exposure initiating element 16 is actuated to start several sequences including a conventional exposure, an electronic image capture and operation of the flash 20 properly timed with the exposure and the image capture. The camera then continues automatically to sequence through several post exposure operations in preparation for the next exposure.

The conventional components 12 include those normally found in a camera for exposing photographic film to a scene image. The film 22 is supplied in a roll contained in a cartridge 24. The cartridge 24 is loaded into a supply chamber 26, and the film 22 is threaded across an exposure position 28 into a take-up chamber 30. In the take-up chamber, the film is coupled to a metering drive 32 that advances the film sequentially, one frame after another, from the supply chamber into the exposure position and on to the take-up chamber. The respective frames are exposed to scene images through appropriate optics 34 that focus the images onto the film in the exposure position.

The electronic imaging components 14 include an area array 36 of charge coupled devices (CCDs) positioned in the focal plane of appropriate optics 38. The array 36 converts the scene image into electronic signals that are stored in memory and recorded on a magnetic medium such as a floppy disk 40 or a magnetic layer on the film itself. The electronic image capture is timed, and optics 38 are pointed, to capture essentially the same scene that is recorded on the film 22 by optics 34. Of course a single lens arrangement also could be employed with mirrors or beam splitters for directing the image alternately to the film 22 and the array 36.

Film 22 is supplied in a format similar to existing commercial products often referred to as the thirty five millimeter (35 mm) format. In addition, however, the film includes a thin transparent layer of magnetic material that extends over essentially the same area of the film as the light sensitive emulsion. The magnetic material is approximately one micron thick, which has been found suitable for magnetically recording information as data on the film without interfering with photographic exposure of the coextensive emulsion. This feature is sometimes referred to as magnetics-on-film (MOF), and is provided for magnetically recording or writing and reading data on the film in the camera and during subsequent photofinishing operations.

Data recorded magnetically on the film includes information regarding camera and exposure parameters associated with a scene exposure. More pertinent to the present invention, however, the electronically captured representation of the scene image is recorded on the film, either as a substitute for or in addition to the previously mentioned recording on floppy disk 40. Although the magnetic representation may be lower in resolution than the conventional image captured chemically on the photographic film, it is sufficient for editing and related purposes described in the present specification.

The magnetic representation of the scene image is recorded on the film after the conventional exposure when metering drive 32 is advancing the film. The signal is fed to a multi-channel magnetic recording head 42 that extends across essentially the entire width of the film. Most of the head channels 44 are dedicated to the scene, which is recorded in a format suitable for raster scanned pixels. One or a few channels 46 are reserved for recording editing data according to the present invention. The editing data is recorded in a strip in bytes that are formatted in a manner similar to that typically used for alpha-numeric characters. The data recorded for a respective scene is located in a predetermined position relative to that scene.

After the electronic image is captured, it can be displayed on a viewing panel, such as a liquid crystal display (LCD) 48 (FIG. 3), for editing purposes. The panel image presents a full picture corresponding to the image captured chemically on film 22. The panel also displays electronically moveable markers 50, however, that are manipulated by the camera operator to select and edit all or a portion of the picture for printing.

Figure 4:
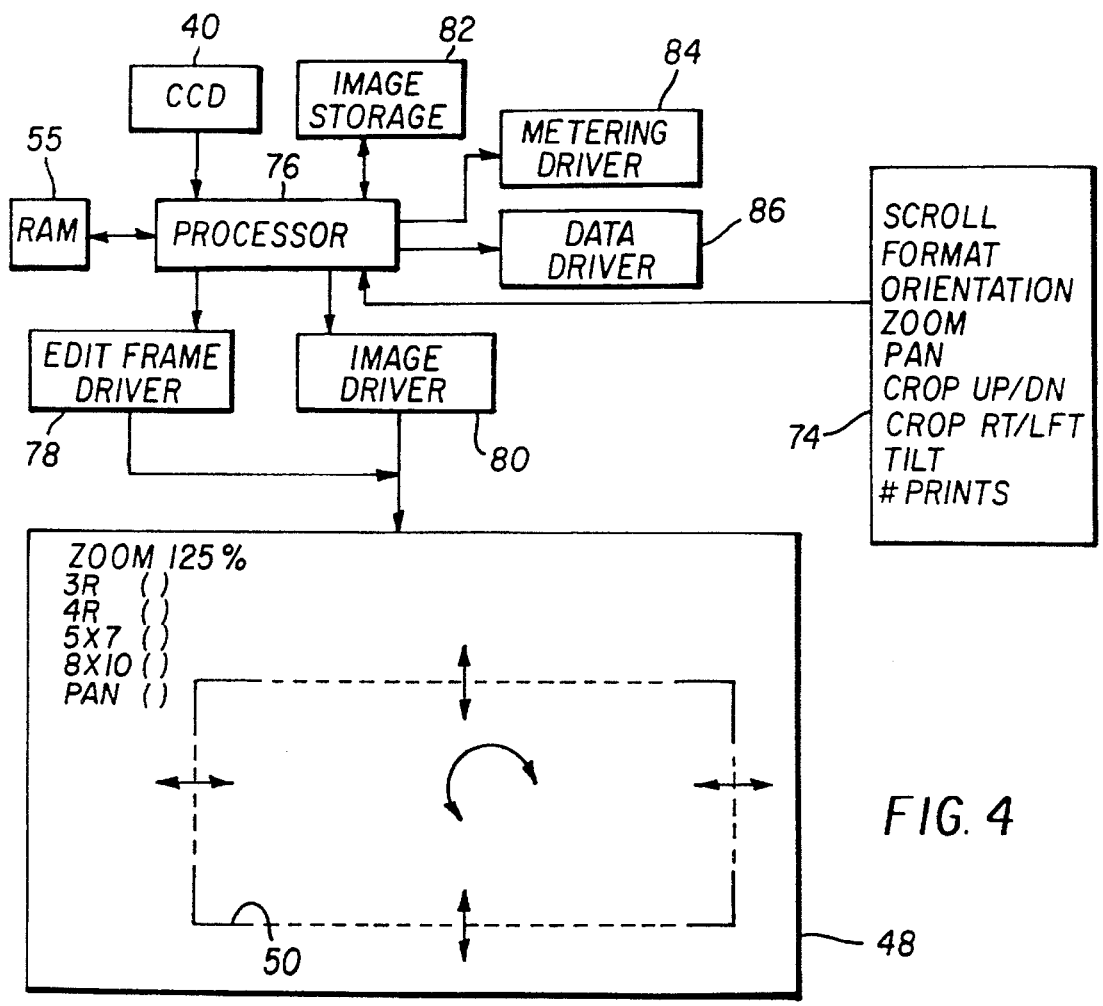
FIG. 4 is schematic representation of logic and control according to the preferred embodiment of FIGS. 1–3.

Referring to FIGS. 3 and 4, the electronic markers 50 are controlled by data input elements on the back of the camera 10 around the display panel 48. Elements 52 and 54 are buttons that scroll between images stored on floppy disk 40, on the magnetic layer of film 22 or in volatile memory 55 (FIG. 4). Element 52 scrolls to earlier exposures and element 54 scrolls to later exposures. After the desired image is presented for editing, typically the print format would be selected by repeatedly depressing input element 56. The possible and currently selected print formats are depicted in a corner 58 of the display 48. Each depression of element 56 cycles through the available options while simultaneously moving markers 50 to represent the aspect ratio for the selected format. The orientation of the print image, between horizontal or vertical, is selected by depressing input element 59. Again, each depression of element 59 moves markers 50, in accordance with the selection, to display a horizontally or vertically oriented picture editing frame. A tilt adjustment 60 also is provided, rotating the markers clockwise or counterclockwise relative to the displayed image. Panning is provided by input elements 62 and 64, which move the markers as a unit or frame to the right or left, using element 62, and up or down, using element 64. Input element 66 indicates the level of zooming by enlarging or shrinking the frame defined by the markers 50. A small marker frame for a given format size represents zooming in, enlarging the image that will be printed. The percent enlargement is displayed in the corner 58 adjacent the format selection. Zooming in combination with panning has the effect of cropping the image. The number of prints also can be selected by element 68. After all of the desired selections are made, the results are saved by depressing input element 70. This captures the editing information and causes it to be recorded magnetically as data on the film. As previously mentioned, the data is recorded through channels 46 in a predetermined position relative to the image to which the data pertains.

In a likely sequence, an electronic image would be captured and stored in random access memory (RAM) 55. The image would be displayed on panel 48 and edited using the above described input elements. The final selection then would be saved and recorded on the film when the corresponding film exposure is advanced from the exposure position 28 by metering drive 32. It also is possible, however, to scroll between images already recorded on other parts of the film, and to edit and record editing selections at other times. Since a low resolution representation of the exposed images also is recorded magnetically on the film, still another and a particularly advantageous feature of the invention permits viewing and editing of previously removed and processed film when additional or different reprints are desired.

Figure 5:
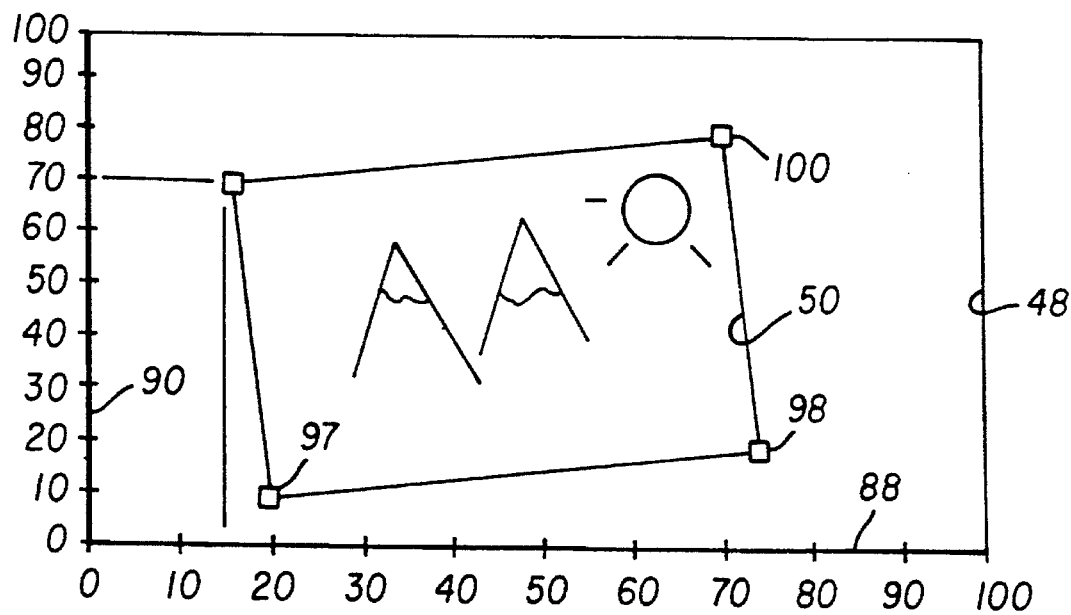
FIG. 5 is an enlarged view of the display of FIG. 3, depicting information that is stored as data representing the results of image editing according to the preferred embodiment.
Figure 6:
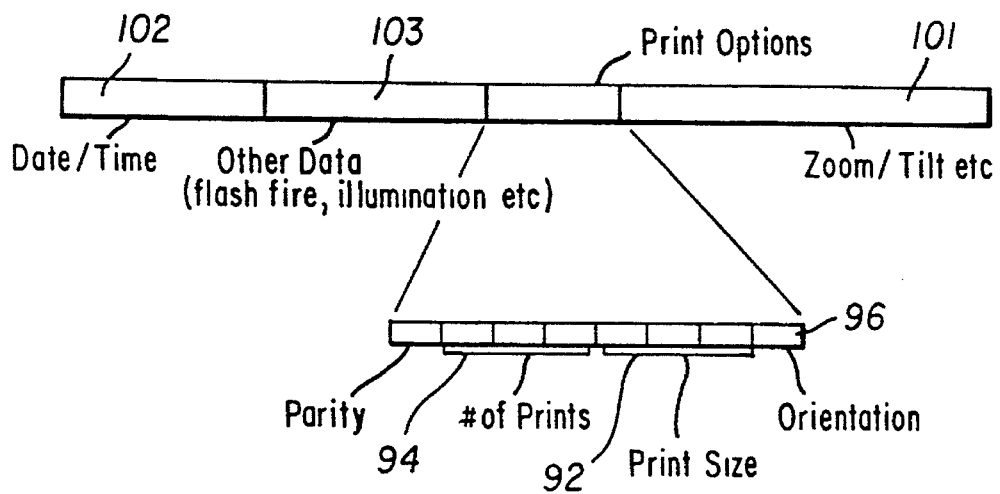
FIG. 6 is a schematic view of data that is recorded magnetically to store the results of the image editing.

Referring now to FIGS. 4–6, editing parameters selected by the previously described input elements, represented in box 74 on FIG. 4, become inputs to microprocessor 76. The microprocessor 76 controls the display through drivers 78 and 80, one displaying the electronic representation of the scene image and the other displaying the markers 50 according to the input selections. The markers 50 can take a number of different forms that define an editing frame, either by establishing the corners of the frame, portions of lateral and end sections or the entire frame boundary.

The microprocessor 76 only permits editing selections that are possible with standard sizes of photographic products. Photographic paper is supplied in a limited number of standard widths. Once a print format is selected, having a predetermined aspect ratio, cropping is limited to selections that are consistent with that aspect ratio and the standard widths for photographic paper. A look-up table is be provided, for example, including the known standards.

Microprocessor 76 also controls a conventional shutter and aperture for capturing the conventional image on film 22; the array 36 for capturing the electronic image; appropriate storage 82, which is either or both of the floppy disk 40 and the magnetic recording on film 22; film metering driver 84, which controls metering drive 32; and data driver 86, which records the data on the film magnetic layer through head channels 46 (FIG. 1).

FIGS. 5 and 6 represent the information format for recording the editing selections on the film. The display 48 is divided into one hundred segments both horizontally, or along an x-axis 88, and vertically, or along a y-axis 90 normal to the x-axis. Two or three bits 92 record the image size. Another two or three bits 94 record the number of prints for a particular frame. Print orientation is recorded by setting a bit 96. Scroll, zoom, tilt and crop or pan are represented by three corners 97, 98 and 100. The x and y locations of each corner are identified and recorded as six bits 101. The zero x and y position is known relative to the film metering perforations. Other data might include a date and time bit 102 and exposure information 103.

Figure 7:
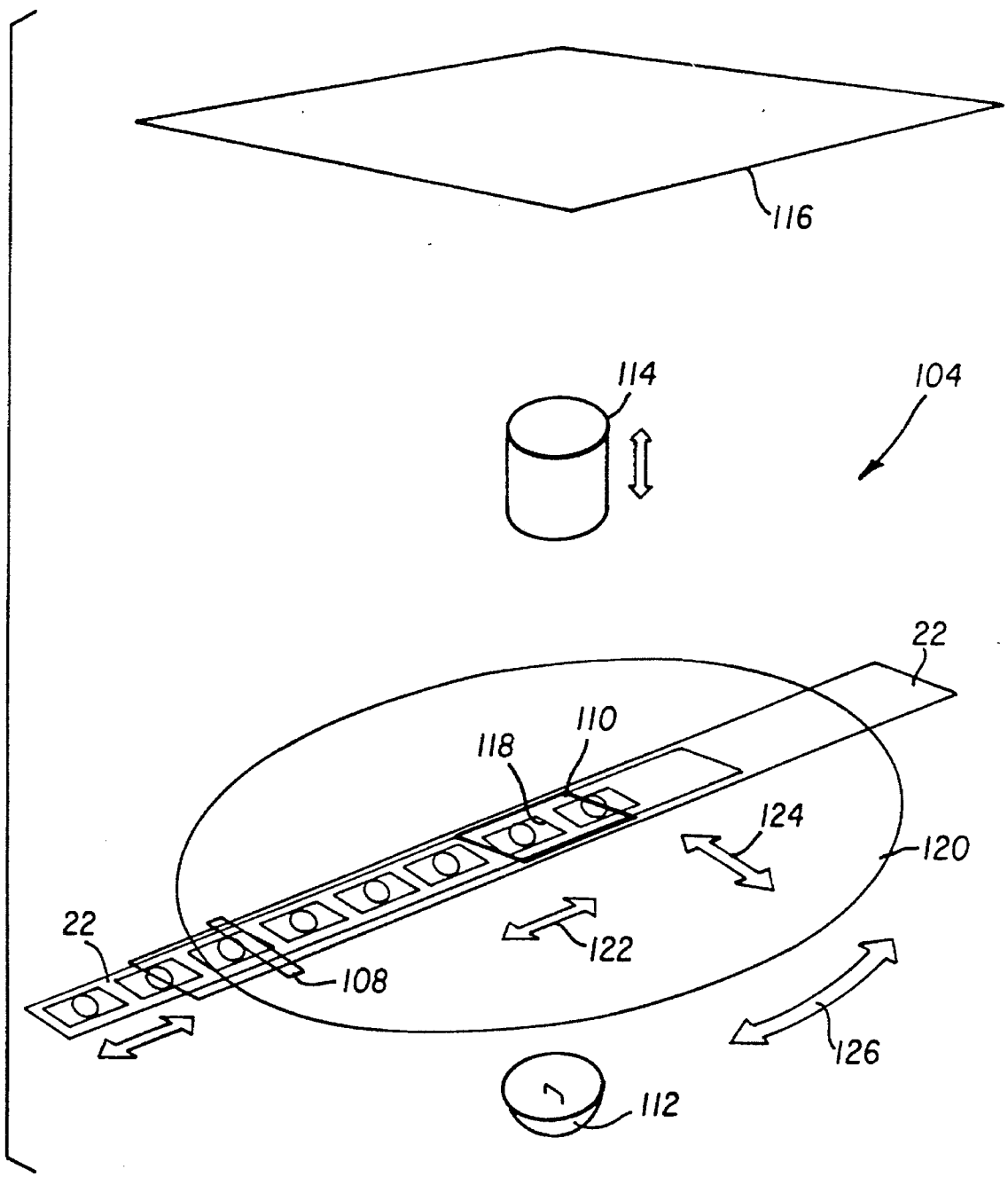
FIG. 7 is a schematic view representing a printing operation using the data stored during electronic editing in the camera of FIG. 1.

Referring now to FIG. 7, a printing station 104 is depicted for producing prints according to the editing instructions. The film 22 is moved longitudinally past a magnetic read/write station 108 where a multi-channel magnetic head reads the editing data from the strip where it was recorded in the camera 10. The film continues to a printer gate 110 optically aligned on an axis between a source of illumination 112 and the printing optics 114. Gate 110 blocks the illumination until the editing adjustments are made, and then opens to expose photographic paper 116 to the film frame 118 in the gate 110. Prior to exposing the paper, the editing instructions are carried out automatically by zooming optics 114 in accordance with the selected magnification, by changing the shape of the gate 110 to change its size and aspect ratio, and by moving the gate supporting structure 120 to move the gate and film relative to the optics. Movement of the supporting structure includes movement for panning and cropping in the x and y directions represented by arrows 122 and 124, and rotationally to provide tilt, as represented by arrow 126. As previously mentioned, the photographic paper comes in standard widths, and the editing instructions recorded by the camera include only those possibilities consistent with the standard paper widths.

Other embodiments of printing apparatus could substitute electronic functions for the mechanical components described above. In such an alternative embodiment, the film would be scanned to digitize the film image, converting the processed film image into corresponding electronic signals. The digitized signals then would be zoomed and cropped electronically according to the instructions recorded on the film. The edited print then would be printed onto an image recording media with a CRT printer. Of course other print materials and printers could be employed. In a further embodiment, the digitized film image is stored on an image recording medium such as a compact disk, magnetic tape, non-volatile electronic memory, etc. for viewing on a television, computer monitor or other soft display.

It should now be apparent that the invention provides the many advantages set forth above in a mechanism and process that are relatively simple and reliable. Editing is carried out by electronically moving framing markers on a fixed electronic image displayed on the camera back. Zooming, tilting panning and cropping are accomplished by moving the markers, instead of the image, and the marker movement is driven by appropriately identified input elements surrounding the display.

While the invention is described in connection with a preferred embodiment, other modifications and applications will occur to those skilled in the art. The claims should be interpreted to fairly cover all such modifications and applications within the true spirit and scope of the invention.

| PARTS LIST FOR FIGS. | |
| --- | --- |
| Reference No. | Part |
| 10. | Camera. |
| 12. | Conventional photographic components. |
| 14. | Electronic imaging components. |
| 16. | Exposure initiating element. |
| 18. | View finder. |
| 20. | Electronic flash. |
| 22. | Film. |
| 24. | Cartridge. |

-continued

PARTS LIST FOR FIGS.

| Reference No. | Part |
| --- | --- |
| 26. | Supply chamber. |
| 28. | Exposure position. |
| 30. | Take-up chamber. |
| 32. | Metering drive. |
| 34. | Optics. |
| 36. | Area array. |
| 38. | Optics. |
| 40. | Floppy disk. |
| 42. | Magnetic head. |
| 44. | Scene tracks. |
| 46. | Alpha-numeric track. |
| 48. | LCD. |
| 50. | Editing markers. |
| 52. | Scroll input element. |
| 54. | Scroll input element. |
| 55. | RAM (volatile memory). |
| 56. | Format input element. |
| 58. | Display corner. |
| 59. | Orientation input element. |
| 60. | Tilt input element. |
| 62. | Crop input element. |
| 64. | Crop input element. |
| 66. | Zoom input element. |
| 68. | # prints input. |
| 70. | Save input. |
| 72. | RAM. |
| 74. | Input elements |
| 76. | Microprocessor. |
| 78. | Edit frame driver. |
| 80. | Image display driver. |
| 82. | Image storage. |
| 84. | Film metering driver. |
| 86. | Data recording driver. |
| 88. | x-axis. |
| 90. | y-axis. |
| 92. | Image size data bits. |
| 94. | Print orientation data bits. |
| 96. | Orientation bit. |
| 97, 98 & 100. | Edited image corners. |
| 101. | Zoom, tilt, and crop data bits. |
| 102. | Date & time bit. |
| 103. | Exposure information bit. |
| 104. | Printing station. |
| 108. | Read/write station. |
| 110. | Printer gate. |
| 112. | Illumination source. |
| 114. | Zooming optics. |
| 116. | Photographic paper. |
| 118. | Film frame. |
| 120. | Gate supporting structure. |
| 122 & 124. | x & y adjustment arrows. |
| 126. | Tilt adjustment arrow. |

What is claimed is:

1. A camera for exposing photographic film to a scene image, the camera including an electronic display for rapidly presenting a visible representation of the image exposed on the film; characterized in that:

said camera includes a driver for presenting electronically moveable markers on the display framing said image representation, and a driver control for cropping said image representation with said markers to select a print frame; and, said control records data on the film defining said selected print frame by said marker positions.

2. The invention of claim 1, wherein said control includes means for limiting the selected print frame to aspect ratios consistent with standard print formats.

3. The invention of claim 1, wherein said camera includes an input for selecting a print format from a predetermined set of print formats, each respective format in said set having a predetermined aspect ratio corresponding to a standard photographic print format.

4. The invention of claim 1, wherein the film includes a transparent magnetic layer, the camera includes a magnetic head, and said control records said data magnetically through said head on said layer.

5. A camera for exposing photosensitive film to a scene, the camera including an electronic image capturing mechanism for rapidly displaying a visible representation of the film-exposed image; characterized in that:

said electronic image capturing mechanism includes moveable framing marks and means for selectively moving said framing marks relative to the image representation to zoom and crop said image representation with said framing marks; and, means for recording data on the film indicating the position of said framing marks, thereby identifying a desired print from said film-exposed image.

6. The invention of claim 5, wherein said camera includes an input for selecting a print format from a predetermined set of print formats, each respective format in said set having a predetermined size and aspect ratio, and wherein said moving means limits said framing marks to a frame format consistent with said selected print format.

7. A process capturing information in a camera for use during photofinishing; said process comprising:

exposing photosensitive film in a camera to a scene image;

capturing and displaying in the camera an electronic image representing the scene image;

manipulating framing marks relative to the electronic image to select one or more printing factors including image format, zoom ratio, pan position and cropping;

recording the one or more printing factors on the film in a predetermined position relative to the scene image; and reading the selected printing factors from the film during photofinishing and applying said factors to a print of the scene image.

8. The invention of claim 7, wherein said print is exposed on an image recording media having a width selected from a set of standard widths, and said printing factors selected by said manipulating step are limited to factors consistent with said standard widths.

9. The invention of claim 7, further including the steps of:

scanning said film to obtain a digital representation of said scene image; and utilizing said digital representation and said one or more printing factors in a digital printer to make a digital print of said scene image.

10. A process capturing information in a camera for use during photofinishing; said process comprising:

exposing photosensitive film in a camera to a scene image;

capturing and displaying in the camera an electronic image representing the scene image;

manipulating framing marks relative to the electronic image to select one or more printing factors including image format, zoom ratio, pan position and cropping;

recording the one or more printing factors on the film in a predetermined position relative to the scene image; and reading the selected printing factors from the film during photofinishing;

scanning said film to obtain a digital representation of at least part of said scene image;

recording said digital representation of said scene image onto a digital recording medium such that at least a portion of said scene image can be viewed on an image display device such as a television.

11. The process of claim 10, further including the step of:

recording said printing factors on said digital recording medium such that said printing factors can be used in presenting said scene image on said image display device.

12. The process of claim 10, further including the step of:

recording said printing factors on said digital recording medium such that said printing factors can be used in presenting said scene image on said image display device.

* * * * *